US006683267B1

(12) United States Patent  (10) Patent No.: US 6,683,267 B1
Piazza et al.  (45) Date of Patent: Jan. 27, 2004

(54) GAS-INSULATED SWITCHGEAR DEVICE

(75) Inventors: Costante Piazza, Lodi (IT); Giuliano Guerra, Novi Ligure (IT)

(73) Assignee: ABB Service S.r.l., Milan (IT)

(*) Notice: Subject to any disclaimer, the term of this patent is extended or adjusted under 35 U.S.C. 154(b) by 0 days.

(21) Appl. No.: 10/088,482
(22) PCT Filed: Sep. 25, 2000
(86) PCT No.: PCT/EP00/09580
§ 371 (c)(1),
(2), (4) Date: Mar. 20, 2002
(87) PCT Pub. No.: WO01/26198
PCT Pub. Date: Apr. 12, 2001

(30) Foreign Application Priority Data

Oct. 1, 1999 (IT) .......................................... MI99A2060

(51) Int. Cl.$^7$ .............................................. M01M 9/40
(52) U.S. Cl. ................... 218/2; 218/7; 218/45; 218/47
(58) Field of Search ............... 218/2, 7, 12, 43, 218/79, 67–70, 13, 46; 361/601–604

(56) References Cited

U.S. PATENT DOCUMENTS 4,291,363 A * 9/1981 Oishi ......................... 361/604
4,300,028 A * 11/1981 Cronin et al. ................ 200/252
4,379,957 A * 4/1983 Calvino ........................ 218/2
5,796,060 A * 8/1998 Fuchsle et al. ............... 218/79

FOREIGN PATENT DOCUMENTS

GB  A-2 143 089  1/1985

* cited by examiner

Primary Examiner—Lincoln Donovan
Assistant Examiner—M. Fishman
(74) Attorney, Agent, or Firm—Guido Modiano; Albert Josif; Daniel O'Byrne

(57) ABSTRACT

A gas-insulated switchgear device for high- and medium-voltage applications, comprising an enclosure which contains a disconnection unit which is electrically connected to a first electric terminal and is arranged in the enclosure in a substantially central position, and a first interruption unit and a second interruption unit which can be connected electrically to the disconnection unit and, respectively, to a second electric terminal and a third electric terminal, the first and second interruption units being arranged mutually opposite with respect to the disconnection unit.

18 Claims, 5 Drawing Sheets

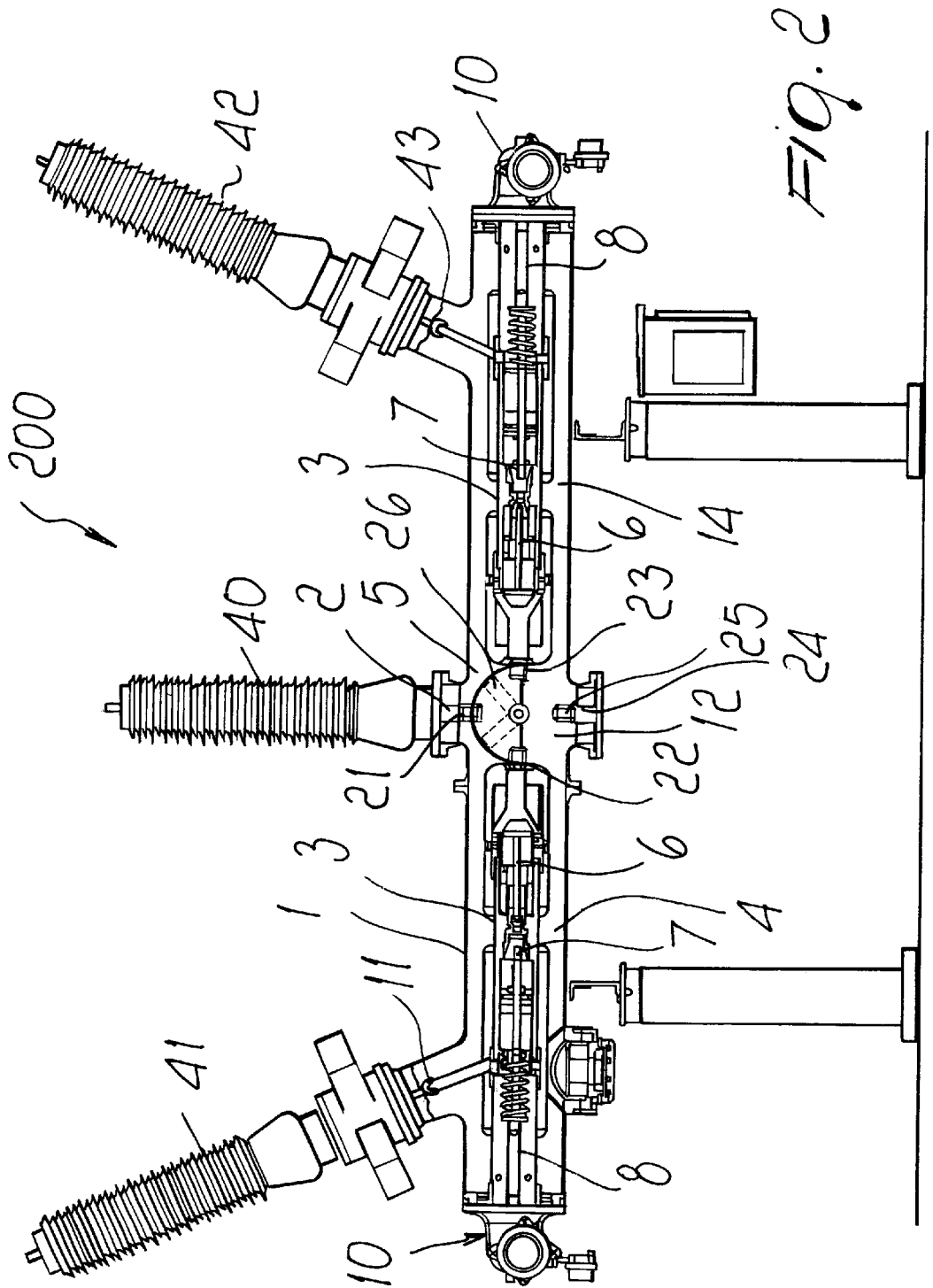

GAS-INSULATED SWITCHGEAR DEVICE

BACKGROUND OF THE INVENTION

The present invention relates to a gas-insulated switchgear device for high- and medium-voltage applications, having improved functions and characteristics; the expression "high- and medium-voltage applications" is used to reference applications with operating voltages equal to or above 1000 Volt.

In particular, the device according to the invention, by virtue of its innovative structure, allows to optimize execution of the required electric maneuvers, according to a solution which is at once simple, effective and compact.

It is known from the art that electric switching operations, for both interruption and disconnection, in gas-insulated circuit breaker and disconnector units are provided by virtue of the translatory motion of one or more moving contacts which can couple/uncouple with respect to corresponding fixed contacts. A significant drawback of known types of devices is the fact that the various switching operations, for example for disconnection on the input line or on the output line, are performed by means of dedicated components which are structurally separate and mutually distinct; in this way, the number of components used to implement the various switching operations is large and entails an increase in the space occupation and total volume of the device, with a consequent cost increase.

Furthermore, the contacts are moved by using actuation devices which generally comprise actuators of the mechanical or hydraulic type which require complicated kinematic systems to transmit motion to the moving contact. In particular, the disconnection maneuver requires the coordinated movement of one or more moving contacts, so that the opening/closure of the disconnection contacts occurs in the intended sequence. This usually entails complicated coupling mechanisms and/or complicated actuation and control systems, especially when disconnection occurs on multiple-bar systems. In view of the mechanical complexity of the movement elements and of the large number of components used, maintenance interventions are necessary in order to maintain nominal behavior and ensure repeatability of performance.

This structural complexity has an even worse impact when the various circuit breaker and disconnector units are used to provide substations. An example in this regard is shown in FIG. 1, which schematically illustrates a minimal configuration of an electrical substation of the single distribution bar type. As shown in said figure, each phase of the main power line 101 is connected in input to a corresponding distribution bar 100; at least one disconnector 102 and a current transformer 103 are used along the junction conductor that connects a phase of the line 101 to the corresponding bar 100. In turn, the bars 100 are electrically connected to a power transformer 104, which appropriately varies the voltage so as to obtain an adequate level thereof in input to a set of medium-voltage devices, generally designated by the reference numeral 105; ahead of the power transformer 104 there are also surge arresters 106 which protect the transformer against possible damage. A second disconnector 102, a second current transformer 103 and a circuit breaker 109 are used along the connection between each bar 100 and the power transformer 104. In output from the substation, each bar 100 is connected to the corresponding phase of the line 101 according to an architecture which is similar to the input architecture, i.e., by using another disconnector 102 and an additional current transformer 103.

In the most common applications, the minimum configuration of the electrical substation is generally conveniently supplemented by using additional primary components; in particular, two voltage transformers, two disconnectors and two circuit breakers are used for each phase of the main power line 101, arranging them respectively at the input connection and in output between the line phase and the bar of the substation. The substation is furthermore equipped with a series of secondary components, constituted by protection and control systems, in order to ensure the correct electrical operation of the system and avoid dangerous damage.

Owing to the large number of components required, even for the provision of a minimal configuration, known types of substation are unsatisfactory in practical use mainly due to their high cost, to their space occupation requirements and to the need for frequent maintenance. Said substations furthermore do not have a structure of the modular type which makes them conveniently flexible in their applications and easy to implement according to the various application requirements.

SUMMARY OF THE INVENTION

The aim of the present invention is to provide a gas-insulated switchgear device for high- and medium-voltage applications which is capable of integrating the functions that in the current art are performed by multiple structurally mutually distinct components.

Within the scope of this aim, an object of the present invention is to provide a gas-insulated switchgear device for high- and medium-voltage applications which allows great flexibility and simplicity in the execution of the required electric switching operations.

Another object of the present invention is to provide a gas-insulated switchgear device for high- and medium-voltage applications which has a compact structure and small dimensions, so as to significantly reduce the space occupation requirements.

Another object of the present invention is to provide a gas-insulated switchgear device for high- and medium-voltage applications which has a reduced mechanical complexity.

Another object of the present invention is to provide a gas-insulated switchgear device for high- and medium-voltage applications which easily allows to realize different application configurations, particularly for the implementation of substations with a single and/or double conducting bar system.

Another object of the present invention is to provide a gas-insulated switchgear device for high- and medium-voltage applications which is highly reliable, relatively easy to manufacture and at competitive costs.

This aim, these objects and others which will become apparent hereinafter are achieved by a gas-insulated switchgear device for high- and medium-voltage applications, characterized in that it comprises an enclosure which contains a disconnection unit which is electrically connected to a first electric terminal and is arranged in the enclosure in a substantially central position, and a first interruption unit and a second interruption unit which are connected electrically to the disconnection unit and, respectively, to a second electric terminal and a third electric terminal, said first and second interruption units being arranged mutually opposite with respect to the disconnection unit.

The device according to the invention can be of the segregated-phase or joined-phase type, for a single-bar or multiple-bar system, with single-pole or three-pole actuation.

The device according to the invention therefore has a compact structure which integrates, within a single body, both the circuit-breaking elements and the disconnection elements, according to a solution which in any case allows to perform the required electrical switching operations simply and effectively.

BRIEF DESCRIPTION OF THE DRAWINGS

Further characteristics and advantages of the invention will become apparent from the description of some preferred but not exclusive embodiments of a switchgear device according to the invention, illustrated only by way of non-limitative example in the accompanying drawings, wherein:

FIG. 2 is a view of the switchgear device according to the invention;

DESCRIPTION OF THE PREFERRED EMBODIMENTS

Figure 1:
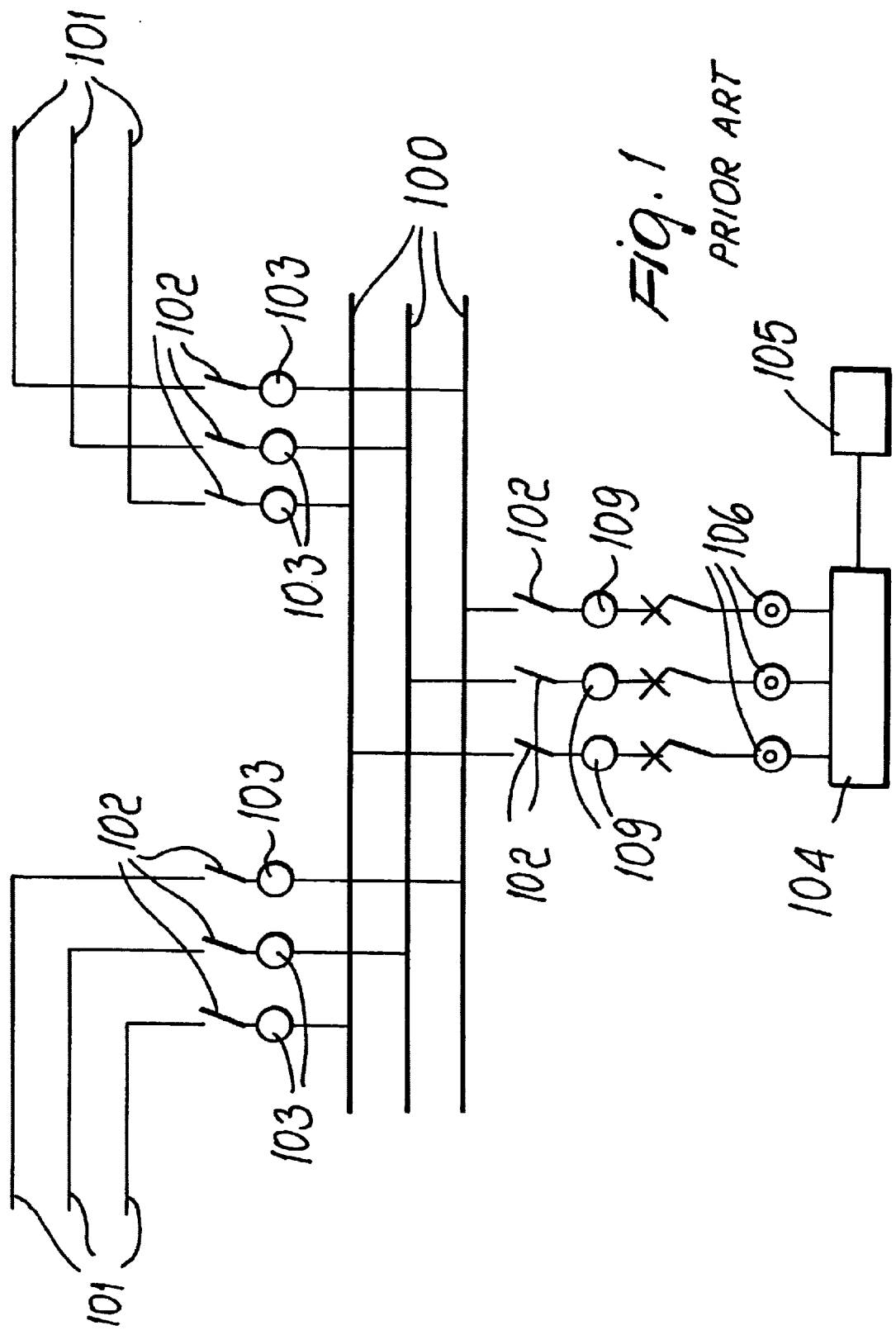
FIG. 1 is a schematic view of a known type of electric power transmission and distribution substation.

With reference to FIG. 2, the switchgear device according to the invention, generally designated by the reference numeral 200, comprises an enclosure 1 which contains an insulating gas and internally accommodates a first interruption unit 4, a second interruption unit 14 and a disconnection unit 5. The disconnection unit 5 is electrically connected to a first electric terminal 2 and to the two interruption units 4 and 14 in the manner described hereinafter; in turn, the interruption units 4 and 14 are electrically connected to a second electric terminal 11 and to a third electric terminal 13, respectively. In the embodiment shown in FIG. 2, the electric terminals 2, 11 and 13 (which are partially visible in the figure) are accommodated in corresponding bushings, designated by the reference numerals 40, 41 and 42 respectively, which are connected to the enclosure 1.

Advantageously, the disconnection unit 5 is arranged inside the enclosure 1 in a substantially central position, with the two interruption units 4 and 14 arranged mutually opposite with respect to the disconnection unit 5.

In particular, the interruption units 4 and 14 comprise an interruption chamber 3 which accommodates a fixed contact 6 and a moving contact 7 which is operatively controlled by actuation means; the moving contact 7 of each one of the interruption units 4 and 14 is electrically connected to the terminal 11 and to the terminal 13, respectively. The actuation means comprise an actuating rod 8 which is connected to the moving contact 7 and is actuated by an appropriate actuation and control device 10. The actuation and control device can be constituted by a mechanical or hydraulic or hydraulic-pneumatic or electric actuator; preferably, the use of an electric motor with position control, particularly a servomotor, allows advantages in terms of speed and precision in executing the contact opening/closure switching operations.

The disconnection unit 5 comprises a first fixed contact 21 which is connected to the electric terminal 2, a second fixed contact 22 which is connected to the fixed contact 7 of the interruption unit 4, a third fixed contact 23 which is connected to the fixed contact 7 of the interruption unit 14, and at least one moving contact 24 which can be coupled to at least one of the fixed contacts 21, 22 and 23. Advantageously, in the embodiment shown in FIG. 2, the disconnection unit 5 comprises a single moving contact 24 which can be coupled to the three fixed contacts 21, 22 and 23; said moving contact 24, which is constituted for example by a blade which has a sector-like profile, is fixed to a rotating shaft 12 substantially at right angles to the axis of the shaft 12. In this manner, the moving contact 24 rotates rigidly with the shaft 12 and the fixed contacts 21, 22 and 23 lie on its plane of rotation. Clearly, for the sake of simplicity in description, when the present description refers to the relative position of the fixed contact and of the moving contact, reference is always meant to the relative position of the ends of the fixed contact and of the moving contact that can be coupled thereto.

Alternatively, according to the various application requirements, it is possible to arrange the fixed contacts 21, 22 and 23 on multiple mutually offset planes, using in this case multiple moving contacts which are fixed to the rotating shaft 12; in this case, the moving contacts rotate on different planes and are arranged at an appropriate angle to each other so as to allow electrical connections between the pairs of contacts in the intended sequences. As an alternative, it is possible to adopt a system with one or more moving contacts which perform a translatory motion, or other solutions, so long as they are compatible with the application.

Advantageously, the rotating shaft 12 is actuated by appropriate actuation means, preferably constituted by an electric motor, not shown, which is operatively connected to said shaft 12. In particular, it has been found that the use of a servomotor provides considerable advantages in terms of operation precision and speed. Alternatively, it is possible to use mechanical or hydraulic actuation means. Manual actuation means can also be provided as an alternative, or as an addition, to the above described actuation means, particularly for performing emergency manual operations.

As shown in FIG. 2, the disconnection unit 5 furthermore comprises a fourth fixed contact 25 which is grounded. In the case of FIG. 2, the fixed contact 25 is connected to the enclosure 1, which is grounded, and lies on a plane which is different from the plane of the fixed contacts 21, 22 and 23. Correspondingly, the device according to the invention uses a second moving contact 26 which can be coupled to the fixed contact 25; said moving contact 26, which is for example configured like an L-shaped blade with substantially identical sides, is fixed to the shaft 12 and rotates rigidly therewith on the plane of rotation on which said fixed contact 25 lies.

Figure 3C:
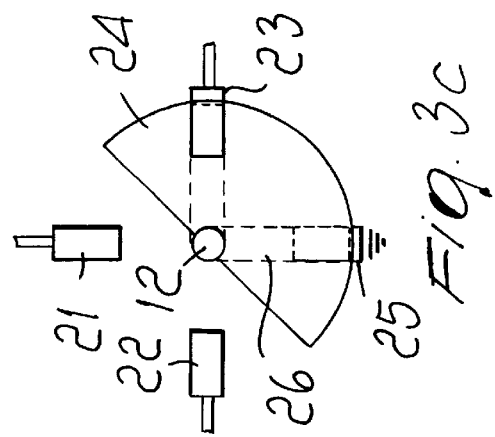
FIGS. 3a–3f are schematic views of some possible electrical switching operations that can be performed with the device of FIG. 2.
Figure 3F:
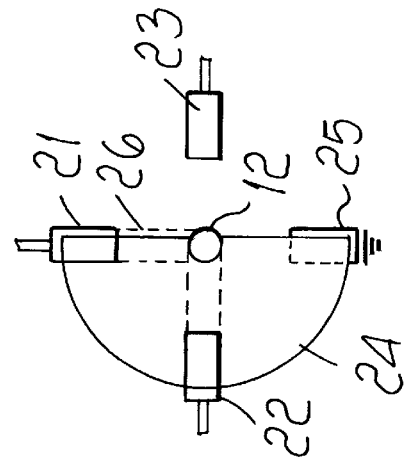
Figure 3B:
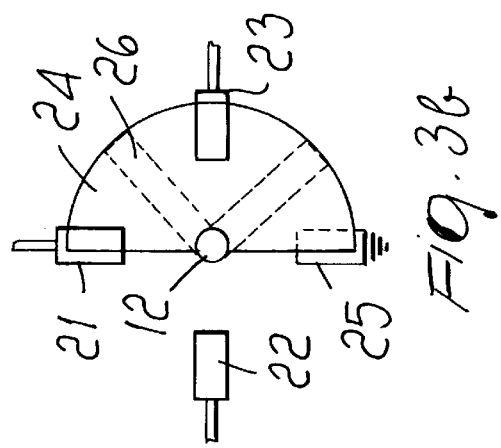
Figure 3E:
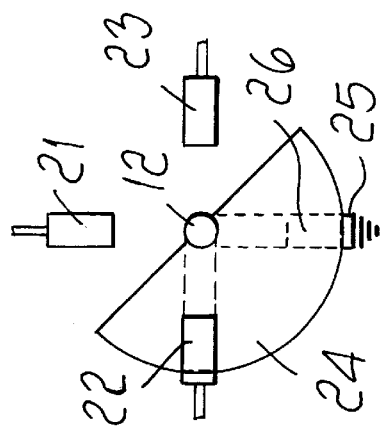
Figure 3A:
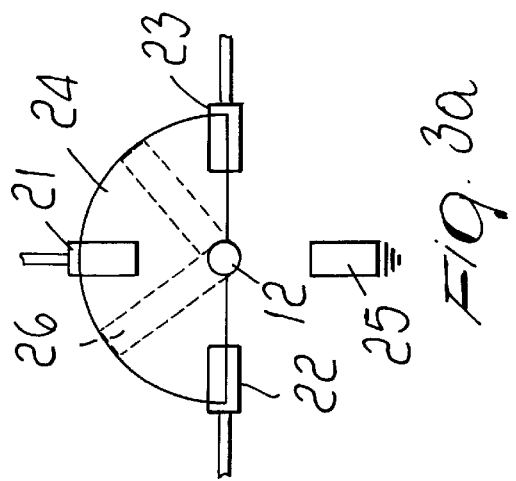
Figure 3D:
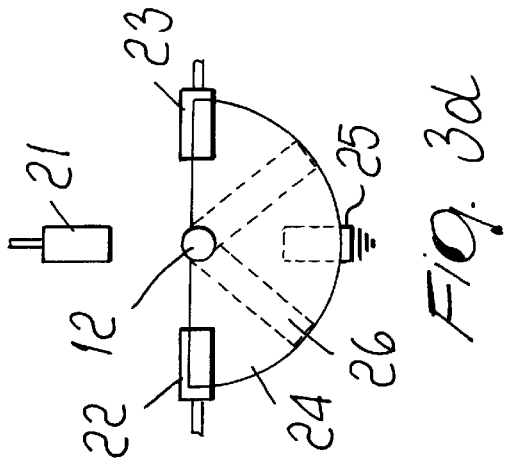

With this arrangement it is possible to perform various electric switching operations in a very simple and flexible manner. For example, as shown in FIGS. 3a–3f, it is possible to have:

the contact 24 simultaneously coupled to the contacts 21, 22 and 23, and the contacts 26 and 25 uncoupled (FIG. 3a);

the contact 24 coupled to the contacts 21 and 23, and the contacts 22, 25 and 26 uncoupled (FIG. 3b);

the contact 24 coupled to the contact 23, the contacts 25 and 26 coupled to each other, and the contacts 21 and 22 uncoupled (FIG. 3c);

the contact 24 coupled to the contacts 22 and 23, and the contacts 21, 25 and 26 uncoupled (FIG. 3d);

the contact 24 coupled to the contact 22, the contacts 25 and 26 coupled to each other, and the contacts 21 and 23 uncoupled (FIG. 3e);

the contact 24 coupled to the contacts 21 and 22, and the contacts 23, 25 and 26 uncoupled (FIG. 3f).

In addition to these possible configurations it is obviously possible to provide other switching operations according to the various application requirements.

The solution shown in FIG. 2 is particularly advantageous, in that the longitudinal axes of the two interruption chambers 4 and 14 are substantially mutually aligned and lie at right angles to the rotation axis of the switching shaft 12; in this manner, the maneuvers of the disconnection unit occurs by turning the shaft 12 and by turning the moving contacts about the axis of said shaft, while the opening/closure of the interruption units 4 and 14 occurs by virtue of a simple translatory motion of the moving contacts along the longitudinal axis of the respective interruption chamber. In this manner one achieves optimum distribution of the space occupied inside the enclosure 1 with a solution which allows extreme flexibility in the electrical switching operations that can be performed and in the connections that can be provided between said device 200 and elements arranged externally thereto, for example loads to be handled, power supply lines, et cetera, as described in detail hereinafter.

Furthermore, the disconnection unit 5 can be arranged so that the axis of the rotation shaft 12 is positioned in a substantially horizontal plane, as shown in FIG. 2, or alternatively, so that the axis of the rotation shaft 12 is positioned in a substantially vertical plane, i.e. in a direction which is perpendicular to the axis position of FIG. 2 and to the longitudinal axes of the interruption units; in this case, the motor which drives the shaft 12 may be positioned on the lower part of the enclosure 1, with the disconnection contacts correspondigly arranged inside the enclosure itself.

The device thus conceived, by virtue of its structural compactness and functional flexibility, is particularly suitable for use in a substation for electric power transmission and distribution, both with a three-phase system with single conducting bar and with a three-phase system with two conducting bars, according to several application configurations. Accordingly, the present invention also relates to a substation for electric power transmission and distribution which is connected to a three-phase power supply line and is characterized in that it comprises at least one switchgear device according to the invention.

In particular, it is possible for example to connect the terminals 11 (or 13) and 13 (or 11), respectively in input and in output, to a phase of a main power supply line and to connect the terminal 2 to a load, for example a power transformer; or to connect the terminal 11 (or 13) in input to the power supply phase, the terminal 13 (or 11) to a load, and the terminal 2 in output to said phase. Another possible alternative is to connect the terminal 2 in input to the power supply phase and the terminals 11 and 13 to two corresponding loads, for example two power transformers.

Figure 4:
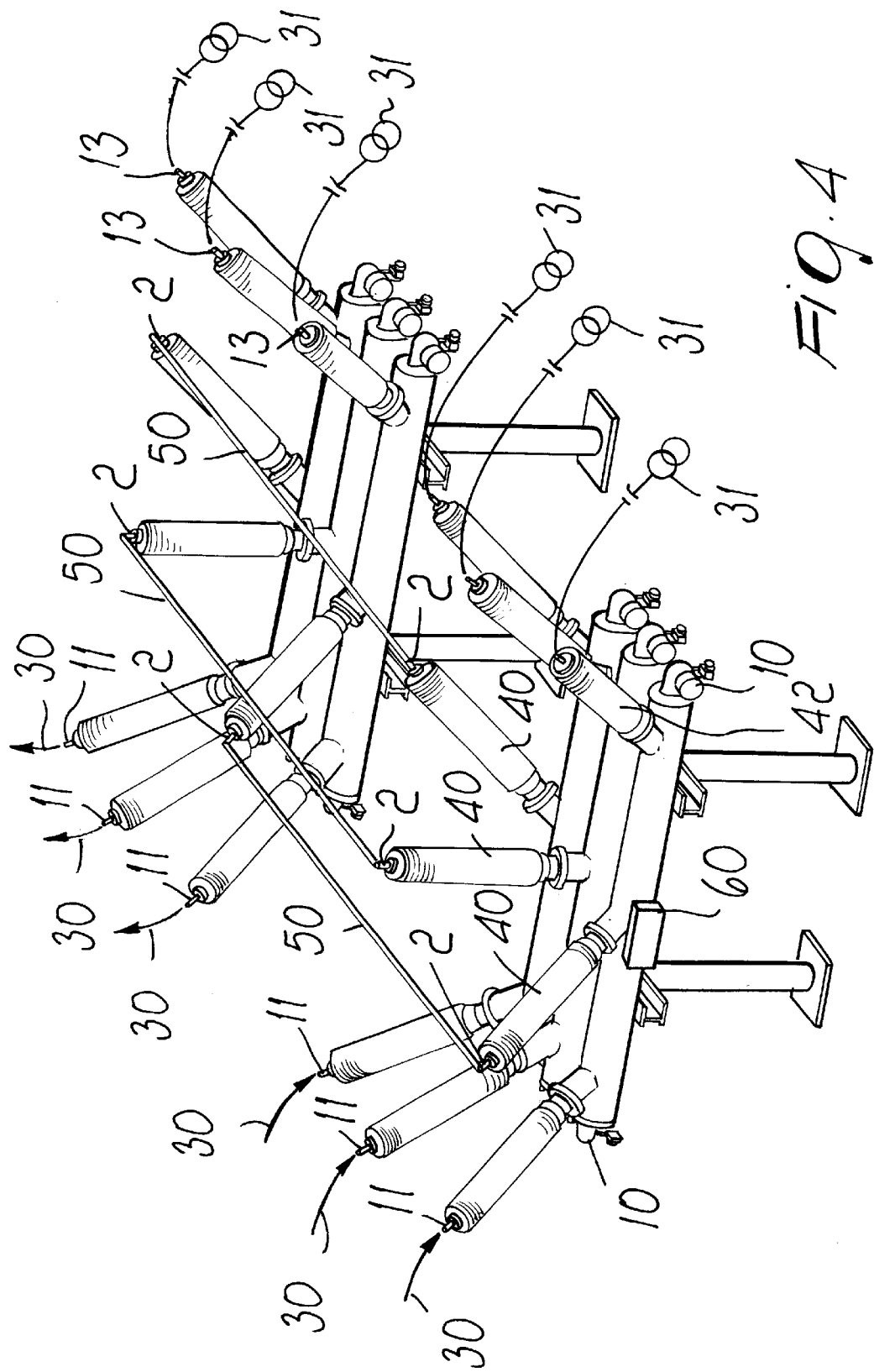
FIGS. 4 and 5 are views of a possible embodiment of an electric substation with a three-phase single-bar system which uses the device of FIG. 2.
Figure 5:
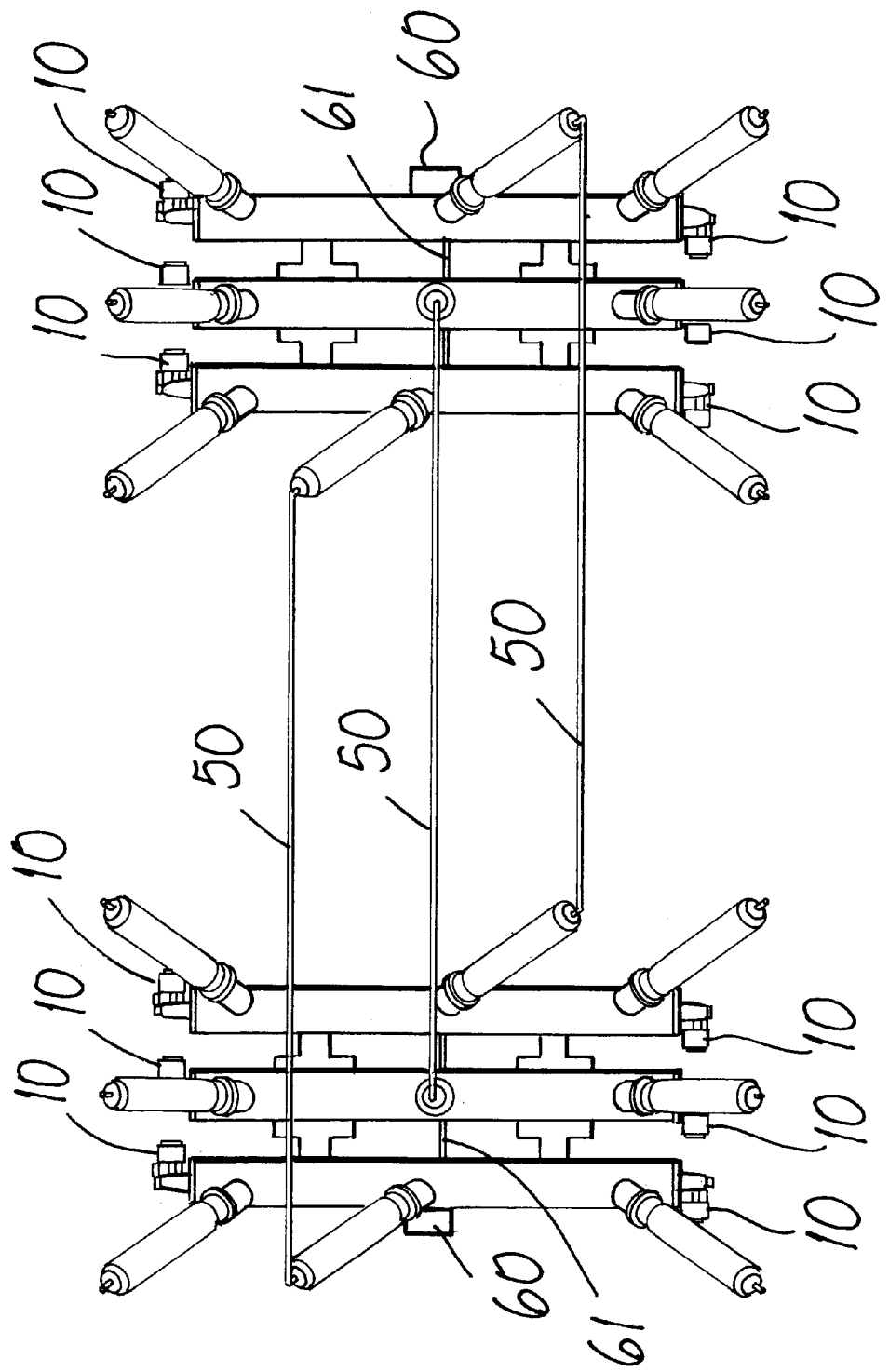

A preferred embodiment of a substation with a three-phase single-bar system, using multiple switchgear devices 200 according to the invention, is shown in FIGS. 4 and 5. As shown in said figures, each phase 30 of a three-phase power supply line to which the substation is connected uses two switchgear devices 200. In particular, a first device 200 has a terminal 11 connected in input to the power supply phase 30, a terminal 13 connected in output to a power transformer 31, and a terminal 2 connected, by means of an air-insulated conducting bar 50, to the corresponding terminal 2 of the second device 200. In turn, the second device 200 has its terminals 11 and 13 (or, vice versa, 13 and 11) connected respectively in output to the power supply phase 30 and to a power transformer 31. In this manner, there are two sets of three devices 200 arranged side by side, with a much more compact configuration than known substations. This configuration is rendered even more compact by the fact that, for each of the two sets of three devices 200, the bushing 40 that belongs to the central device 200 is arranged on a substantially vertical plane, and the other two bushings 40 that belong to the devices 200 that are arranged laterally are orientated in mutually opposite directions with respect to the central bushing.

Another considerable advantage consists of the fact that the devices used in the substation can be of the single-pole actuation type, in which actuation means are provided on each individual phase to perform the disconnecting operation; as an alternative, they can be of the type with three-pole actuation, in which the energy for performing disconnection on the three phases of the device is provided by a single actuation means which is mechanically coupled to the disconnection units of each individual phase. An example in this regard is shown schematically in FIGS. 4 and 5, in which each one of the two sets of three devices 200 uses a single electric motor 60, preferably a servomotor. In this case, as shown in FIG. 5, the motor 60 is located at one of the devices 200 that are arranged laterally and is connected to the three corresponding disconnection units by means of a single through shaft 61 on which the various moving contacts are appropriately arranged. As an alternative, the motor 60 can also be arranged on the central device 200.

Furthermore, a similar actuation system with single three-pole actuation can also be used for switching the interruption units; in this case it is in fact sufficient to use two motors 10, arranged at a device 200, each of which is mechanically connected to the actuation rods of the moving contacts of three interruption units arranged side by side.

The substation shown in FIGS. 4 and 5 can furthermore be implemented by using, for example, an additional set of three devices 200 arranged side by side and connected sequentially to the first two sets of three, as described above; the connection between the sets of three can furthermore be provided by using, instead of the bars 30, junction devices of the type known in the art, provided with interruption units where necessary. According to another embodiment, the connection between pairs of devices 200 can be provided by replacing the containment bushings 40 and the conducting bars 30 with metal-clad ducts, so as to provide an even more compact metal-clad structure, with a reduced vertical extension and accordingly with a reduced visual impact. In this manner it is furthermore possible to eliminate the air-insulated bars, with a consequent advantage from the point of view of maintenance. In this case, as in the previously described configurations, the terminals 11 and 13 can be accommodated in the respective bushings 41 and 42 and can also be connected to the power supply phases directly by cabling instead of by air-insulated means.

If one wishes to provide a substation with a three-phase system with two conducting bars, the switchgear device 200 can be modified in a very simple way; in this case it is in fact sufficient to use a fourth connection terminal and to provide the disconnection unit with an additional fixed contact, which is connected to the fourth terminal, and optionally with a further moving contact which can be coupled to said fixed contact. The fourth terminal can be accommodated in a bushing which is arranged proximate to the bushing 40 and is connected to the corresponding bushing of the second device 200 with a bar 30, as described earlier; in this case also, in order to provide the connections between the pairs of devices 200 it is possible to use metal-clad ducts instead of the containment bushings and the conducting bars. The electrical connections in input and in output to the devices 200 can furthermore be provided by air-insulated means, by utilizing the bushings, or by providing cabled connections.

The gas-insulated switchgear device thus conceived is susceptible of modifications and variations, all of which are within the scope of the inventive concept; all the details may furthermore be replaced with technically equivalent elements. In practice, the configurations considered, so long as they are compatible with the specific use, as well as the individual components, may be any according to the requirements and the state of the art.

What is claimed is:

1. A gas-insulated switchgear device for high- and medium-voltage applications, comprising an enclosure which contains a disconnection unit which is electrically connected to a first electric terminal and is arranged in the enclosure in a substantially central position, and a first interruption unit and a second interruption unit which are connected electrically to the disconnection unit and, respectively, to a second electric terminal and a third electric terminal, said first and second interruption units being arranged mutually opposite with respect to the disconnection unit, wherein said first and second interruption units each comprise an interruption chamber which accommodates a fixed contact and a moving contact.

2. The switchgear device according to claim 1, wherein the disconnection unit comprises a first fixed contact, a second fixed contact and a third fixed contact which are respectively connected to said first terminal and to said first and second interruption units, and at least one moving contact which can be coupled to at least one of said fixed contacts.

3. The switchgear device according to claim 2, comprising a first moving contact which can be coupled to said first, second and third fixed contacts, said moving contact being fixed to a rotary operating element and rotating rigidly therewith, said fixed contacts lying on a rotation plane of said moving contact.

4. The switchgear device according to claim 3, wherein the first moving contact is constituted by a blade which has a sector-shaped profile, is keyed on said rotary operating element and is substantially perpendicular to a rotation axis of said operating element.

5. The switchgear device according to claim 2, wherein the disconnection unit comprises a fourth fixed contact which is grounded.

6. The switchgear device according to claim 5, wherein the disconnection unit comprises a second moving contact which can be coupled to the fourth fixed contact, said second moving contact being fixed to the operating element and rotating rigidly therewith, the fourth fixed contact being arranged on the rotation plane of the second moving contact.

7. The switchgear device according to claim 5, wherein the first moving contact and the second moving contact are fixed to the switching element so as to rotate on two different rotation planes.

8. The switchgear device according to claim 4, wherein the rotary operating element is actuated by an electric motor.

9. The switchgear device according to claim 4, wherein said moving contact which is accommodated in the interruption chamber is operatively controlled by actuation means, a longitudinal axis of said interruption chamber being arranged substantially at right angles to the rotation axis of the operating element.

10. The switchgear device according to claim 9, wherein said actuation means comprise a servomotor.

11. The switchgear device according to claim 4, wherein the rotary operating element is positioned so that its rotation axis lies in a substantially horizontal plane.

12. The switchgear device according to claim 4, wherein the rotary operating element is positioned so that its rotation axis lies in a substantially vertical plane.

13. An electric power transmission and distribution substation, suitable to be connected to a three-phase power supply line, comprising at least one switchgear device according to claim 1.

14. The substation according to claim 13, comprising, for each phase of the power supply line, a first switchgear device and a second switchgear device, the first device having a first electric terminal which is connected to a first terminal of the second device, a second electric terminal which is connected in input to a power supply phase, a third electric terminal which is connected to a first power transformer, said second device having a second electric terminal which is connected in output to the power supply phase and a third electric terminal which is connected to a second transformer.

15. The substation according to claim 14, wherein the first, second and third electric terminals are respectively accommodated in a first, second and third bushing respectively, and in that the first terminal of the first device is connected to the first terminal of the second device by means of an air-insulated conducting bar.

16. The substation according to claim 15, wherein the switchgear devices are divided into two sets of three devices arranged side by side, the first bushing of the device that is positioned centrally in the set of three being arranged on a substantially vertical plane, the first bushings that belong to the two devices of the set of three that are positioned laterally being orientated in mutually opposite directions with respect to said vertical plane.

17. The substation according to claim 14, wherein the first terminal of the first device is connected to the first terminal of the second device by means of a metal-clad duct.

18. The substation according to claim 1, comprising, for a set of three switchgear devices, a single electric motor which is suitable to actuate the three corresponding disconnection units.

* * * * *